bine engine fuel system comprises a positive-displacement
2,916,875

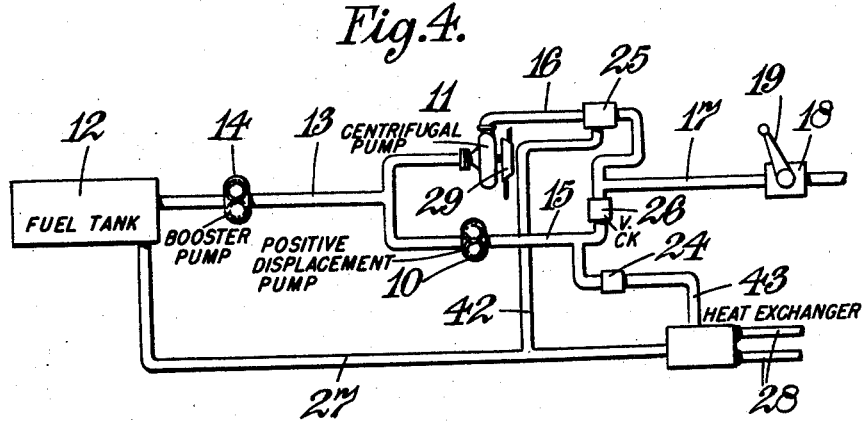
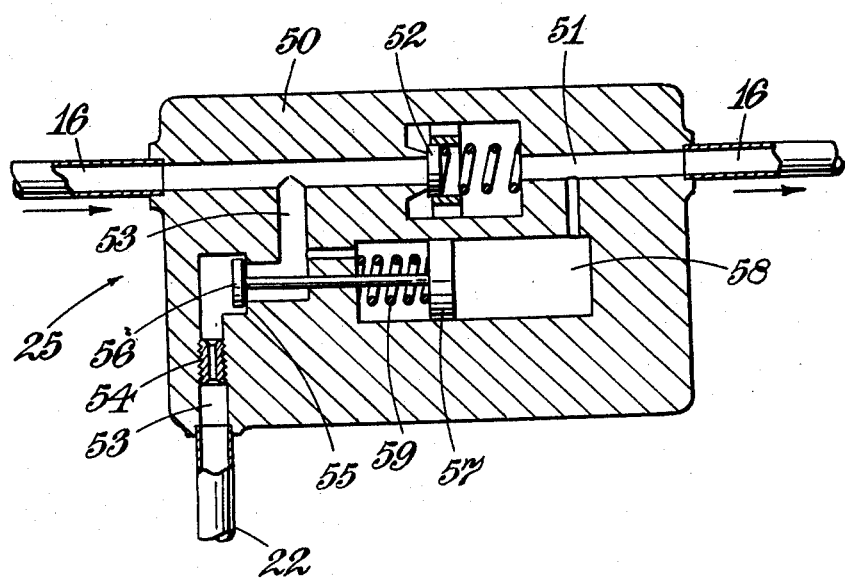

GAS TURBINE ENGINE FUEL SYSTEMS

Frederick William Walton Morley, Castle Donington, and Henry Cook, Darley Abbey, Derby, England, assignors to Rolls-Royce Limited, Derby, England, a British company Application August 16, 1954, Serial No. 449,958

Claims priority, application Great Britain September 9, 1953

9 Claims. (Cl. 60—39.28)

This invention relates to gas-turbine engine fuel systems.

The primary object of the invention is to provide a gas turbine engine fuel system having desirable attributes in regard to the installation of gas turbine engines in aircraft; the invention may, however, be applied to gas turbine engines used for other purposes, for example for the propulsion of land vehicles or marine vessels.

According to the present invention, a gas turbine engine fuel system comprises a positive-displacement fuel-pressurising pump and a centrifugal fuel-pressurising pump, said pumps delivering fuel in parallel to fuel-flow-controlling means adjustable to regulate the flow of fuel to the engine, at least said positive-displacement pump being mechanically driven by the engine, by-pass fuel flow ducting for returning fuel delivered by one or both of said pumps directly or indirectly to the inlet side of one or both of said pumps, and flow control means in said by-pass ducting to maintain a required pressure upstream of said fuel-flow-controlling means.

According to one arrangement of this invention, the centrifugal pump is driven by a gas-operated turbine supplied with working medium compressed in the engine. For example the centrifugal pump may be driven by an air turbine supplied with air compressed by a compressor system of the engine. In another arrangement, the centrifugal pump is driven mechanically from the engine. It will be appreciated that whether the pump is driven by a gas-operated turbine or by a mechanical drive from the engine, at low engine speeds the centrifugal pump will not normally develop sufficient fuel pressure to effect a fuel supply through the fuel-flow-controlling means adequate to maintain operation of the engine at those low speeds. The mechanically-driven positive-displacement pump is used to effect this supply.

However, when the engine is operating in the higher range of its running speeds, the centrifugal pump will develop adequate delivery pressures and flows and under such conditions the whole or part of the delivery flow from the positive-displacement pump may be by-passed through the by-pass ducting referred to.

By-passed fuel may be returned to a fuel supply tank of the engine or in certain cases may be returned directly to inlet ducting of one or both pumps.

In certain preferred embodiments of the invention the capacity of the positive displacement pump is selected to be sufficient to permit starting of the engine without the use of an additional "booster pump." In this connection it will be understood that starting of a gas turbine engine is normally effected by rotating a compressor turbine rotor assembly by means of an external power source and igniting fuel introduced into combustion equipment, whereby the compressor/turbine rotor assembly becomes self-driving. Certain known arrangements of gas turbine engines have utilised "booster pumps" for the purpose of introducing sufficient fuel into the combustion equipment in starting. It will be appreciated, however, that the positive-displacement pump used in accordance with the present invention may be of sufficient capacity to provide adequate fuel flow for starting without the use of such a booster pump. The provision of a pump having such capacity may result in considerable excess delivery at high rotational speeds of the engine and such fuel may be by-passed in arrangements according to the invention.

A further feature of the invention enables the positive-displacement pump to operate at a relatively low maximum pressure, such as is suitable for example to supply fuel to the engine in the lower speed range of operation, whilst the centrifugal pump is arranged to deliver fuel at pressures in excess of said maximum positive-displacement pump delivery pressure to maintain an adequate fuel supply in the higher speed range.

Preferably automatic valving arrangements are used for controlling the flow of by-passed fuel through the by-pass ducting. Such automatic valving arrangements may comprise relief valves, non-return valves and/or pressure-sensitive valves introduced in the fuel by-pass system and the associated pump delivery ducting leading to the fuel flow controlling means.

For example in a simple embodiment of the invention the by-pass ducting leads from the delivery ducting of the positive-displacement pump, and this by-pass ducting includes a relief valve which is set to determine a maximum delivery pressure of the positive-displacement pump. In the associated delivery ducting a non-return valve is provided, whereby when the delivery pressure of the centrifugal pump exceeds said maximum preselected relief valve pressure the non-return valve closes and the whole of the delivery flow of the positive-displacement pump passes through the by-pass ducting.

In accordance with yet another feature of the invention by-pass ducting is connected to the delivery ducting of the centrifugal pump, and flow control means are provided for causing the whole of the delivery of the centrifugal pump to pass through said by-pass ducting until the centrifugal pump delivers a pressure at least equal to the delivery pressure of the positive-displacement pump.

A number of preferred embodiments of the invention will now be described with reference to the accompanying drawings, in which:

Figures 1 to 4 illustrate one embodiment each, and

Figure 5 illustrates a construction of part of the fuel systems of Figures 1 to 4.

Figure 1:
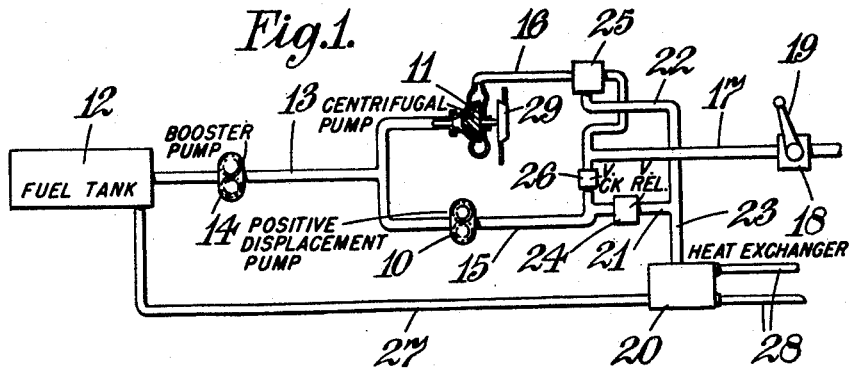

In each of the illustrated embodiments, the gas turbine engine fuel system comprises a positive-displacement pump 10, for example a gear pump, which is driven by the engine through a suitable mechanical drive (not shown). In addition a centrifugal pump 11 is provided which is driven by an air turbine 29 fed with compressed air tapped from a compressor system of the engine. A suction pipe 13 leads to the inlets of the pumps 10, 11 from a suitable fuel storage tank 12, and a low-pressure booster pump 14 may be provided to assist in delivering the fuel from the tank 12. The two pumps 10, 11 deliver in parallel through delivery pipes 15, 16 respectively and these pipes join a common high-pressure delivery pipe 17 upstream of a fuel-flow-controlling means 18 which is arranged to regulate the flow of fuel to the engine, being manually settable say through lever 19 to select the required fuel flow. Such fuel-flow-controlling means 18 may be of any known or convenient kind, and preferably includes a device sensitive to barometric pressure for compensating the fuel flow according to changes of aircraft altitude and possibly also according to changes of flight speed. Such devices are well-known and their construction forms no part of the present invention.

Referring now to Figure 1, in the first embodiment of the invention separate by-pass ducts 21, 22 are provided from the delivery pipes 15, 16 of each of the pumps, and these by-pass ducts are connected to a duct 23 leading to the entry of one flow path through a fuel-cooled lubricating oil cooler 20. The by-pass duct 21 leading from the delivery pipe 15 of the gear pump 10 has fitted in it a spring-loaded relief valve 24 set to the maximum desired delivery pressure of the gear pump 10, and the by-pass duct 22 leading from the delivery pipe 16 of the centrifugal pump 11 includes a restrictor which may as indicated at 54 in Figure 5 form part of a unit 25 comprising also an automatic valve device associated with the by-pass duct 22 and the delivery pipe 16 of the centrifugal pump 11. The automatic valve device of unit 25 functions to close off the path through the delivery pipe 16 and to open the path through the by-pass duct 22, when the pressure downstream of the valve device, i.e., upstream of the fuel-flow-controlling means 18, is in excess of the delivery pressure of the centrifugal pump 11. One form of construction and arrangement of the unit 25 comprising the restrictor 54 and the automatic valve device will be described below with reference to Figure 5. The restrictor 54 functions to build up the delivery pressure of the pump 11 with increase of delivery flow of the pump, and it is arranged that a condition is reached on increase of speed of the engine when the delivery pressure of the pump 11 exceeds the pressure in the delivery pipe 17 immediately upstream of the fuel-flow-controlling means 18. The valve device then operates automatically to close off the path through the by-pass duct 22 and to permit a delivery flow from the centrifugal pump 10 to the fuel-flow-controlling means 18. A further increase in delivery pressure of the centrifugal pump 11 may result in the pressure immediately upstream of the fuel-flow-controlling means 18 becoming higher than the setting of the relief valve 24 of the gear pump 10, whereby the whole of the delivery of this pump passes through the associated by-pass duct 21. A non-return valve 26 is provided to prevent a flow from the centrifugal pump 11 into the delivery pipe 15 and thus through the relief valve 24. A return pipe 27 conveys the fuel from the oil cooler 20 back to the fuel tank 12. The oil pipes leading to the cooler 20 are indicated at 28.

Figure 2:
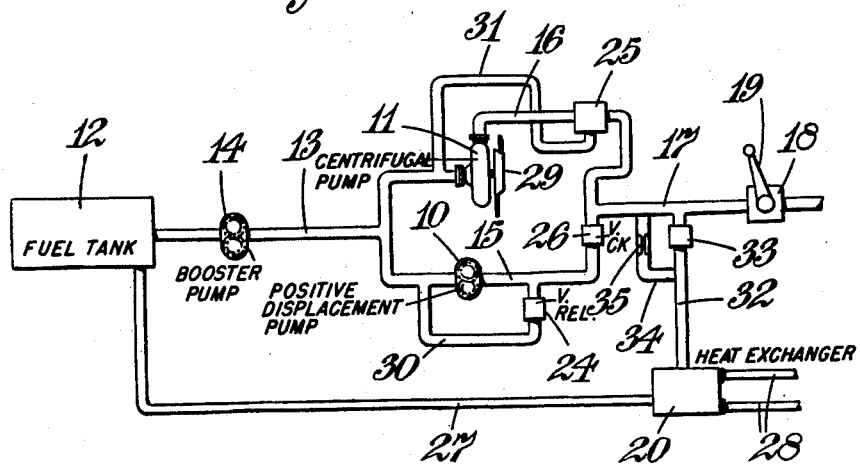

In a second embodiment of the invention (Figure 2) the pump 10 has a by-pass duct 30 leading from its delivery side to the inlet side, and the pump 11 has a corresponding by-pass duct 31. The relief valve 24, the automatic valve device and restrictor unit 25, and the non-return valve 26 are used in the manner described in the embodiment of Figure 1, the valve 24 being in the duct 30, and the unit 25 being at the junction of the duct 31 with the delivery pipe 16. In addition a further by-pass duct 32 leads from a location in the common delivery pipe 17 upstream of the fuel-flow-controlling means 18 to the lubricating oil cooler 20 and the fuel is conveyed from the cooler 20 back to the storage tank 12 by the pipe 27. The by-pass duct 32 has fitted in it a relief valve 33 which is arranged to open at a predetermined pressure below the pressure setting of the relief valve 24 in by-pass duct 30 of the gear pump 10. The relief valve 33, when opened, forms a restriction controlling the by-pass fuel flow through the cooler 20. With this arrangement, when starting the engine, no flow of fuel takes place through the cooler 20 until the pressure upstream of the fuel-flow-controlling means 18 reaches the blow-off pressure of the relief valve 33. If desired, there may be provided, as shown, a duct 34 leading from the common delivery pipe 17 in parallel with the relief valve 33 to join the duct 32 downstream of the valve 33, there being in the duct 34 a fixed restrictor 35 permitting a relatively small flow through the cooler 20 under all conditions of operation of the engine including starting.

Figure 3:
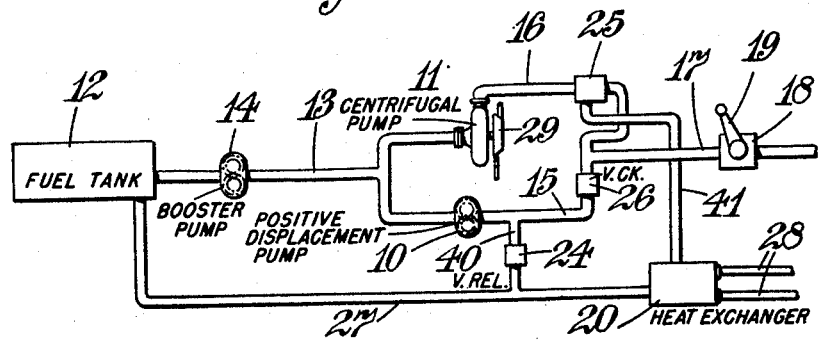

In a third embodiment of the invention (Figure 3) the arrangement of parts is generally similar to that described with reference to Figure 1 but in this case, instead of the by-pass ducts 21, 22 and 23, a by-pass duct 40 (containing the relief valve 24) is taken from the delivery pipe 15 of the gear pump 10 to the return pipe 27 and a by-pass duct 41 is led from the pipe 16 to the oil cooler 20 (the unit 25 being at the junction of duct 41 and pipe 16). In this case therefore the gear pump by-pass fuel does not pass through the lubricating oil cooler 20.

In a fourth embodiment of the invention (Figure 4) the reverse by-pass duct arrangement is employed, there being a by-pass duct 42 leading from the delivery pipe 16 to return pipe 27 and a by-pass duct 43 leading from the pipe 15 to the cooler 20. The relief valve 24 is in the duct 43 and the unit 25 is at the junction of the pipe 16 and duct 42.

One convenient construction of the automatic valve device and restrictor unit 25 for controlling the fuel flow from the centrifugal pump 11 in the manner described, is shown in Figure 5. The unit comprises a body 50 with a bore 51 forming part of the pump delivery pipe 16 and the bore 51 has fitted in it a non-return valve 52 which closes when there is a pressure difference tending to cause a fuel flow from the common delivery ducting 17 towards the pump 11. A side bore 53 leads to the by-pass duct 22 (or 31 or 41 or 42) and has fitted in it a restrictor 54. The side bore 53 also includes a valve seat 55 to cooperate with a piston-operated valve 56.

The piston 57 for the valve 56 is in a chamber 58 connected so that the piston is subjected on the one side to pressure upstream of the non-return valve 52 and on its other side to pressure on the downstream side of the non-return valve 52. During starting and low-speed running conditions of the engine the non-return valve 52 is closed, because the pressure downstream of the valve 52 is in excess of the pressure upstream of the valve, and therefore the piston-operated valve 56 controlling the flow in the by-pass duct 22 is moved to the left in the figure to permit the delivery flow of the centrifugal pump through the associated by-pass duct 22. When, due to the presence of the restrictor 54, the pressure upstream of the non-return valve 52 increases to exceed the pressure on the downstream side thereof, the piston-operated valve 56 closes, so that the centrifugal pump 11 delivers through the non-return valve 52.

A spring 59 may be provided to load the piston 57 in a manner to tend to keep the valve 56 against its seat 55.

We claim:

1. A gas-turbine engine fuel system comprising a positive-displacement fuel-pressurizing pump, mechanical drive means from said engine to said pump whereby said pump is driven at a speed proportional to the speed of the engine, a centrifugal fuel-pressurizing pump, a gas-operated turbine connected to said centrifugal pump to drive it, means to supply working fluid compressed in the engine to said gas-operated turbine to drive it, fuel pipe means connected to said positive-displacement pump and to said centrifugal pump to receive fuel delivered thereby, fuel-flow-controlling means in said fuel pipe means and adjustable to regulate the flow of fuel from the pumps to the engine, a first by-pass duct having an inlet connected to the delivery of said positive-displacement pump, a relief valve connected in said first by-pass duct and adapted to open at a selected maximum delivery pressure of said positive-displacement pump, a second by-pass duct having an inlet connected to the delivery of said centrifugal fuel-pressurizing pump, first non-return valve means connected between said positive-displacement pump and said fuel-flow-controlling means and arranged to prevent flow of fuel delivered by the centrifugal pump through said first by-pass duct, second non-return valve means connected between said centrifugal pump and said fuel-flow-controlling means and arranged to prevent flow of fuel delivered by said positive-displacement pump through said second by-pass duct, said second by-pass duct being connected to the delivery of the centrifugal pump at a point upstream of said second non-return valve means, a valve in said second by-pass duct to control flow therethrough, pressure-responsive means connected to respond to the pressure difference from upstream to downstream of said second non-return valve means and to load the valve in said second by-pass duct in the sense of closure with a load in accordance with said pressure difference, and a flow restrictor in said second by-pass duct in flow series with said valve.

2. A gas-turbine engine fuel system comprising a positive-displacement fuel-pressurizing pump, mechanical drive means from said engine to said pump whereby said pump is driven at a speed proportional to the speed of the engine, a centrifugal fuel-pressurizing pump, a gas-operated turbine connected to said centrifugal pump to drive it, means to supply working fluid compressed in the engine to said gas-operated turbine to drive it, fuel pipe means connected to said positive-displacement pump and to said centrifugal pump to receive fuel delivered thereby, fuel-flow-controlling means in said fuel pipe means and adjustable to regulate the flow of fuel from the pumps to the engine, a first by-pass duct having an inlet connected to the delivery of said positive-displacement pump, a relief valve connected in said first by-pass duct and adapted to open at a selected maximum delivery pressure of said positive-displacement pump, a second by-pass duct having an inlet connected to the delivery of said centrifugal fuel-pressurizing pump, first non-return valve means connected between said positive-displacement pump and said fuel-flow-controlling means and arranged to prevent flow of fuel delivered by the centrifugal pump through said first by-pass duct, second non-return valve means connected between said centrifugal pump and said fuel-flow-controlling means and arranged to prevent flow of fuel delivered by said positive-displacement pump through said second by-pass duct, said second by-pass duct being connected to the delivery of the centrifugal pump at a point upstream of said second non-return valve means, a valve in said second by-pass duct to control flow therethrough, pressure-responsive means connected to respond to the pressure difference from upstream to downstream of said second non-return valve means and to load the valve in said second by-pass duct in the sense of closure with a load in accordance with said pressure difference, and means affording a restriction to flow through said second by-pass duct in flow series with said valve.

3. A gas-turbine engine fuel system according to claim 2, having a fuel tank, said first and second by-pass ducts having outlet ends connected to deliver to said fuel tank.

4. A gas-turbine engine fuel system according to claim 2, comprising a return fuel pipe, said first and second by-pass ducts having outlet ends connected to said return fuel pipe, and a heat exchanger connected in said return fuel pipe so that return fuel flows through the heat exchanger.

5. A gas-turbine engine fuel system according to claim 2, comprising a heat exchanger connected in said first by-pass duct so that fuel flowing in said first by-pass duct flows through said heat exchanger.

6. A gas-turbine engine fuel system according to claim 2, comprising a heat exchanger connected in said second by-pass duct so that fuel flowing in said second by-pass duct flows through the heat exchanger.

7. A gas-turbine engine fuel system according to claim 2, wherein the first by-pass duct has an outlet end connected to the inlet of the positive-displacement pump, and the second by-pass duct has an outlet connected to the inlet of the centrifugal pump.

8. A gas-turbine engine fuel system according to claim 2, comprising a third by-pass duct having an upstream end connected to said fuel pipe means upstream of said fuel-flow-controlling means, a second relief valve connected in said third by-pass duct and set to open at a pressure below the pressure at which said relief valve in the first by-pass duct opens, and a heat-exchanger connected in said third by-pass duct downstream of the second relief valve whereby fuel flowing in said third by-pass duct flows through said heat-exchanger.

9. A gas-turbine engine fuel system according to claim 8, comprising also a further duct having an upstream end connected with the fuel pipe means upstream of the fuel-flow-controlling means and a downstream end connected to said third by-pass duct between said second relief valve and said heat exchanger, and a flow restrictor device connected in said further duct.

References Cited in the file of this patent

UNITED STATES PATENTS

| 1,934,758 | Temple | Nov. 14, 1933 |
| 2,532,856 | Ray | Dec. 5, 1950 |
| 2,581,275 | Mock | Jan. 1, 1952 |
| 2,607,297 | Walker et al. | Aug. 19, 1952 |
| 2,617,361 | Neal | Nov. 11, 1952 |
| 2,640,316 | Neal | June 2, 1953 |
| 2,725,932 | Ballantyne et al. | Dec. 6, 1955 |
| 2,786,420 | Kenney | Mar. 26, 1957 |

FOREIGN PATENTS

| 788,955 | France | Oct. 21, 1935 |
| 577,310 | Great Britain | May 14, 1946 |